(12) United States Patent
Yamazaki et al.

(10) Patent No.: US 12,393,750 B2
(45) Date of Patent: Aug. 19, 2025

(54) COMPUTER-READABLE RECORDING MEDIUM STORING MACHINE LEARNING PROGRAM, INFORMATION PROCESSING APPARATUS, AND MACHINE LEARNING METHOD

(71) Applicant: FUJITSU LIMITED, Kawasaki (JP)

(72) Inventors: Takashi Yamazaki, Kawasaki (JP); Shohei Yamane, Kawasaki (JP); Hiroaki Yamada, Kawasaki (JP); Masatoshi Ogawa, Zama (JP); Yoichi Kochibe, Mihama (JP); Toshiyasu Ohara, Nakano (JP); Takashi Kobayashi, Machida (JP)

(73) Assignee: Fujitsu Limited, Kawasaki (JP)

( * ) Notice: Subject to any disclaimer, the term of this patent is extended or adjusted under 35 U.S.C. 154(b) by 682 days.

(21) Appl. No.: 17/468,810

(22) Filed: Sep. 8, 2021

(65) Prior Publication Data

US 2022/0129607 A1 Apr. 28, 2022

(30) Foreign Application Priority Data

Oct. 28, 2020 (JP) ................................. 2020-180264

(51) Int. Cl.
*G06F 30/27* (2020.01)
*G06F 30/367* (2020.01)

(52) U.S. Cl.
CPC ............ *G06F 30/27* (2020.01); *G06F 30/367* (2020.01)

(58) Field of Classification Search
CPC ..... G06F 30/27; G06F 30/367; G06F 2119/10
See application file for complete search history.

(56) References Cited

U.S. PATENT DOCUMENTS

2020/0193227 A1* 6/2020 Zhou ..................... G06F 18/214

FOREIGN PATENT DOCUMENTS

| EP | 3572957 A1 | 11/2019 | |
|---|---|---|---|
| EP | 3671524 A1 | 6/2020 | |
| JP | 2009-534854 A | 9/2009 | |
| JP | 4460808 B2 * | 5/2010 | ............. G01R 19/08 |

(Continued)

OTHER PUBLICATIONS

Extended European Search Report dated Mar. 3, 2022 of European Patent Application No. 21194561.3, 12 pages.

(Continued)

*Primary Examiner* — Rehana Perveen
*Assistant Examiner* — Cuong V Luu
(74) *Attorney, Agent, or Firm* — Fujitsu Intellectual Property Center

(57) ABSTRACT

The present invention relates to a machine learning program for causing a computer to execute a process. In an example, the process executed by the computer when the program is executed includes: acquiring a current distribution image by an equivalent circuit simulation based on circuit information; acquiring a shape image that indicates a shape of a circuit based on the circuit information; acquiring an EMI value by electromagnetic field analysis based on the circuit information; and generating an EMI prediction model by machine learning based on training data that includes the current distribution image, the shape image, and the EMI value.

5 Claims, 12 Drawing Sheets

(56) References Cited

FOREIGN PATENT DOCUMENTS

WO  2007/124294 A2  11/2007

OTHER PUBLICATIONS

Ma, Zhenchao et al., "Learning-Based Fast Electromagnetic Scattering Solver Through Generative Adversarial Network", IEEE Transactions on Antennas and Propagation, IEEE, USA, vol. 69, No. 4, XP011848112, ISSN: 0018-926X, DOI: 10.1109/TAP.2020.3026447, [retrieved on Apr. 6, 2021], pp. 2194-2208, Sep. 30, 2020.

Li, Yongzhong et al., "Predicting Scattering From Complex Nano-Structures via Deep Learning", IEEE Access, IEEE, USA, vol. 8, XP011802129, DOI: 10.1109/ACCESS.2020.3012132, [retrieved on Aug. 6, 2020], pp. 139983-139993, Jul. 25, 2020.

Chen, Henglin et al., "Modeling and Optimization of EMI Filter by Using Artificial Neural Network", IEEE Transactions on Electromagnetic Compatibility, IEEE Service Center, New York, NY, US, vol. 61, No. 6, XP011764277, ISSN: 0018-9375, DOI: 10.1109/TEMC.2019.2944887, [retrieved on Jan. 3, 2020], pp. 1979-1987, Dec. 1, 2019.

\* cited by examiner

COMPUTER-READABLE RECORDING MEDIUM STORING MACHINE LEARNING PROGRAM, INFORMATION PROCESSING APPARATUS, AND MACHINE LEARNING METHOD

CROSS-REFERENCE TO RELATED APPLICATION

This application is based upon and claims the benefit of priority of the prior Japanese Patent Application No. 2020-180264, filed on Oct. 28, 2020, the entire contents of which are incorporated herein by reference.

FIELD

The embodiment discussed herein is related to a computer-readable recording medium storing machine learning program, an information processing apparatus, and a machine learning method.

BACKGROUND

In recent years, electromagnetic interference (EMI) radiated from a circuit is estimated by using machine-learning technology such as deep learning (DL). EMI refers to a state in which electromagnetic waves are transmitted as noise to a distance and affect other electronic devices, or electromagnetic waves that affect the other electronic devices. For example, an estimation method by DL estimates EMI based on an electronic circuit as an analysis target by using a machine learning model generated from training data in which an electronic circuit for training and simulation results of electromagnetic wave analysis for the electronic circuit are paired.

For example, the relationship between current flowing in a simple circuit and EMI is learned, and EMI is predicted from the distribution of the current flowing in the circuit. The current flowing in the circuit may be obtained by executing equivalent circuit analysis which is one type of electromagnetic analysis.

Normally, in an electronic circuit, a pattern (plane pattern) that extends in a planar shape over a substrate such as a ground plane (GND) or a voltage plane appears frequently. In order to perform equivalent circuit analysis, equivalent circuit modeling is performed by discretization with a lattice or a triangular mesh so as to reproduce the shape of a plane pattern in a circuit as accurate as possible.

Examples of the related art include as follows: Japanese National Publication of International Patent Application No. 2009-534854.

However, in order to accurately reproduce a complex current distribution generated in a plane pattern, discretization with high resolution has to be performed.

For example, modeling capable of analyzing current that jumps over a fine gap in a surface such as a slit, or modeling that expresses the detouring of an electric field at a planar structure outer edge portion including a slit have to be performed. However, performing such modeling increases the calculation cost of equivalent circuit analysis. This increases the calculation cost for EMI estimation and increases the cost of generating training data.

In one aspect of the embodiments disclosed below, there is provided a solution to reduce the cost of generating training data.

According to an aspect of the embodiments disclosed below, the cost of generating training data may be reduced.

SUMMARY

According to an aspect of the embodiments disclosed below, there is provided a machine learning program for causing a computer to execute a process. In an example, the process executed by the computer when the program is executed includes: acquiring a current distribution image by an equivalent circuit simulation based on circuit information; acquiring a shape image that indicates a shape of a circuit based on the circuit information; acquiring an EMI value by electromagnetic field analysis based on the circuit information; and generating an EMI prediction model by machine learning based on training data that includes the current distribution image, the shape image, and the EMI value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
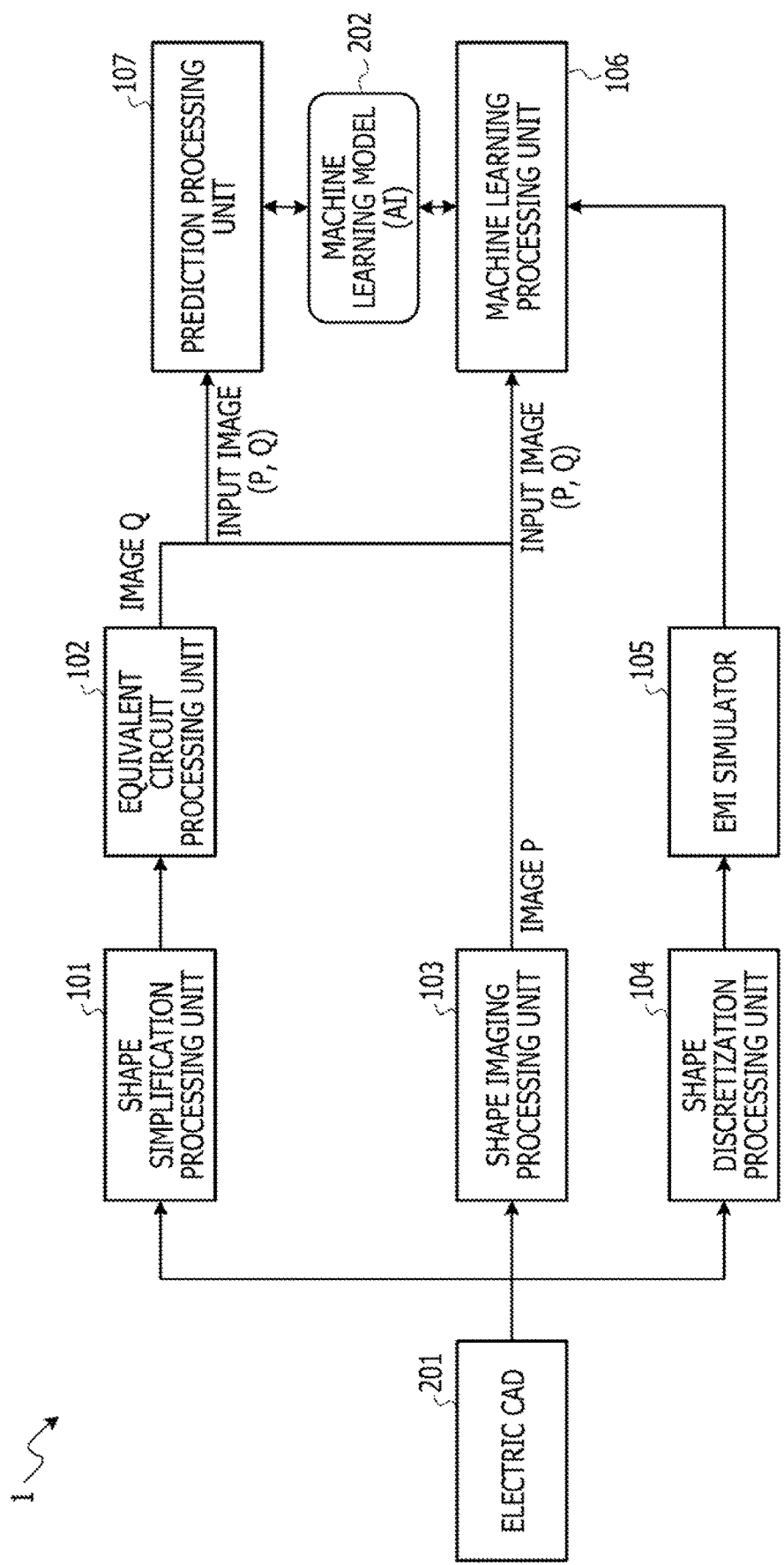
FIG. 1 schematically illustrates a configuration of an information processing apparatus as an example of the embodiment.

Hereinafter, the embodiment of a machine learning program, an information processing apparatus, and a machine learning method will be described with reference to the drawings. The following embodiment, however, is merely an example and does not intend to exclude application of various modification examples and techniques that are not explicitly described in the embodiment. For example, the present embodiment may be variously modified and implemented without departing from the spirit thereof. The drawings do not indicate that only constituent components illustrated in the drawings are provided. The drawings indicate that other functions and the like may be included.

(A) Configuration

FIG. 1 schematically illustrates a configuration of an information processing apparatus 1 as an example of the embodiment.

As illustrated in FIG. 1, the information processing apparatus 1 includes a shape simplification processing unit 101, an equivalent circuit processing unit 102, a shape imaging processing unit 103, a shape discretization processing unit 104, an EMI simulator 105, a machine learning processing unit 106, and a prediction processing unit 107.

Circuit shape data output from an electric computer aided design (CAD) 201 is input to the information processing apparatus 1. The circuit shape data is input to each of the shape simplification processing unit 101, the shape imaging processing unit 103, and the shape discretization processing unit 104.

The electric CAD 201 is a tool used for designing electrical products. It is used for designing an electric circuit and creating a drawing. The function as the electric CAD 201 may be included in the information processing apparatus 1, or may be executed by another information processing apparatus coupled to the information processing apparatus 1 via a communication network such as a local area network (LAN).

In the information processing apparatus 1, an electronic circuit generated by the electric CAD 201 is constituted by laminating a plurality of substrates. Among the plurality of substrates, a substrate formed with a plane pattern in which a conductor extends in a planar shape on the surface of the substrate, such as a GND layer or a voltage plane, is included. Hereinafter, each of the plurality of laminated substrates constituting the electronic circuit may be referred to as a layer. A layer (substrate) on which the plane pattern is generated may be referred to as a plane pattern layer.

The electric CAD 201 generates and outputs circuit shape data representing an electrical structure and a physical structure of the electronic circuit. The circuit shape data output from the electric CAD 201 is input to each of the shape simplification processing unit 101, the shape imaging processing unit 103, and the shape discretization processing unit 104. The circuit shape data also includes arrangement information such as an arrangement order of a plurality of laminated layers (substrates).

The shape simplification processing unit 101 generates a circuit shape (circuit model) obtained by simplifying the circuit shape data based on the circuit shape data generated by the electric CAD 201.

Hereinafter, the simplified circuit model generated by the shape simplification processing unit 101 may be referred to as a simplified circuit model.

Figure 2:
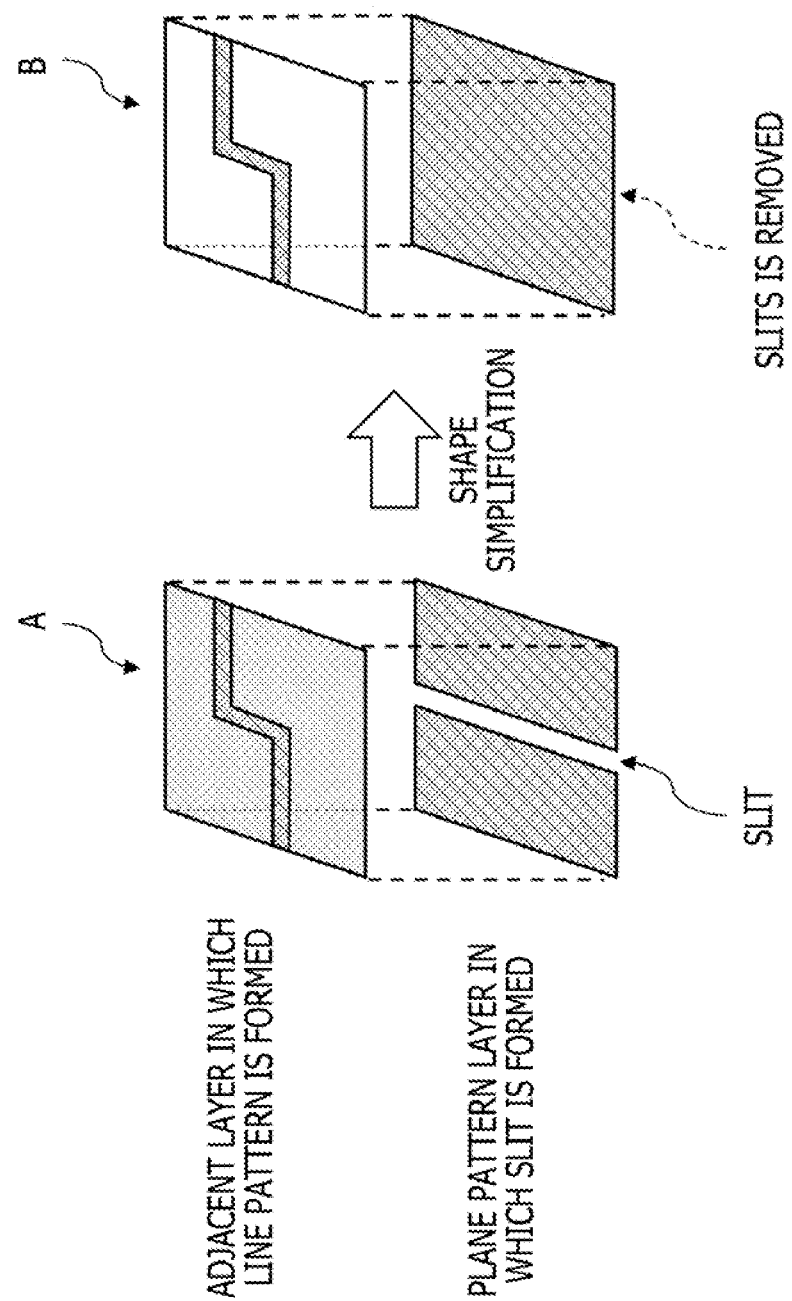
FIG. 2 is for explaining a process by a shape simplification processing unit of the information processing apparatus as an example of the embodiment.

FIG. 2 is for explaining a process by the shape simplification processing unit 101 of the information processing apparatus 1 as an example of the embodiment.

In FIG. 2, reference symbol A indicates a circuit shape before simplification by the shape simplification processing unit 101, and reference symbol B indicates a circuit shape (circuit model) after the simplification processing by the shape simplification processing unit 101.

The shape simplification processing unit 101 generates a simplified circuit model for each of the plurality of layers (substrates) included in the circuit shape data.

In the example illustrated in FIG. 2, a plane pattern layer in which a slit is formed and a layer adjacent to the plane pattern layer in which a line pattern is formed are illustrated.

The shape simplification processing unit 101 simplifies the pattern shape (plane shape) of a plane pattern included in a circuit. When a plane pattern includes specific shapes such as slits and slots that increase the calculation load of a simulation to calculate current distribution, the shape simplification processing unit 101 removes these specific shapes (such as slits and slots) by simplification. The specific shape may be a hole or an opening. For example, in a case where a hole or an opening having a size equal to or smaller than a predetermined size is formed in a plane pattern, the shape simplification processing unit 101 treats the plane pattern as having no hole or opening. The shape simplification processing unit 101 may treat a hole or an opening formed in the plane pattern as being darkly shaded with an object made of the same material as the conductor constituting the plane pattern.

For example, the shape simplification processing unit 101 may generate a simplified shape of the plane pattern by calculating a convex hull and extracting the outline of the contour of the plane pattern.

The shape simplification processing unit 101 extracts only a line pattern from a layer in which the line pattern is formed.

The shape simplification processing unit 101 generates an equivalent circuit model based on the generated simplified circuit model (equivalent circuit modeling). The shape simplification processing unit 101 generates an equivalent circuit model for each of the plurality of layers (substrates) included in the circuit shape data. Equivalent circuit modeling may be achieved by a known method, and a description thereof will be omitted.

However, in achieving equivalent circuit modeling, the shape simplification processing unit 101 does not employ an advanced model for the outer edge portion in the plane pattern layer (planar structure outer edge portion). For example, the shape simplification processing unit 101 performs equivalent circuit modeling on the shape of the outer edge portion on the assumption that there is no interaction between the layers due to the electric field detouring around the outer edge portion.

A plurality of equivalent circuit models generated by the shape simplification processing unit 101 also include arrangement information such as an arrangement order of the plurality of laminated layers in the original circuit shape data.

The equivalent circuit processing unit 102 calculates a current distribution in an electronic circuit for each frequency based on the equivalent circuit model generated by the shape simplification processing unit 101.

The equivalent circuit processing unit 102 may calculate a current distribution for each specific frequency. For example, the equivalent circuit processing unit 102 calculates a current distribution for each of 10 types of frequencies of $9.0 \times 10^8$ Hz, $9.1 \times 10^8$ Hz, $9.2 \times 10^8$ Hz, $9.3 \times 10^8$ Hz, $9.4 \times 10^8$ Hz, $9.5 \times 10^8$ Hz, $9.6 \times 10^8$ Hz, $9.7 \times 10^8$ Hz, $9.8 \times 10^8$ Hz and $9.9 \times 10^8$ Hz.

The equivalent circuit processing unit 102 has a function as an equivalent circuit simulator, and calculates a current distribution in an equivalent circuit model. For example, the equivalent circuit processing unit 102 may obtain a current distribution by using a function as a circuit simulator such as Simulation Program with Integrated Circuit Emphasis (SPICE).

The equivalent circuit processing unit 102 generates an image/images representing the calculated current distribution.

Figure 3:
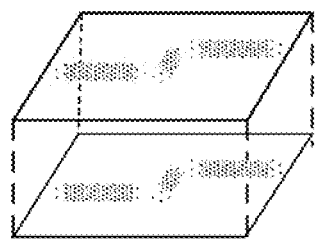
FIG. 3 exemplifies a current distribution calculated by an equivalent circuit processing unit of the information processing apparatus as an example of the embodiment.

FIG. 3 exemplifies a current distribution calculated by the equivalent circuit processing unit 102 of the information processing apparatus 1 as an example of the embodiment.

FIG. 3 illustrates a current distribution calculated based on the equivalent circuit model exemplified in FIG. 2.

The example illustrated in FIG. 3 is an image on which coloring processing is performed over the lines with gradation in which a color becomes dark according to intensity information of the current distribution, in order to display the distribution of current generated over an electronic circuit. For example, an image representing a current distribution is information (image information) indicating the intensity of a current distribution approximating the near field of an electronic circuit. A current distribution over a two-dimensional circuit may be calculated with a smaller amount and in a much shorter time than a three-dimensional electromagnetic field.

Hereinafter, the image representing a current distribution generated by the equivalent circuit processing unit 102 may be referred to as a current distribution image or an image Q.

The equivalent circuit processing unit 102 generates a current distribution image of the real part and a current distribution image of the imaginary part. The image (image Q) representing a current distribution generated by the equivalent circuit processing unit 102 is input (multichannel input) to a machine learning model 202 by the machine learning processing unit 106 together with a circuit geometric shape diagram (image P) generated by the shape imaging processing unit 103 described later.

The function as the equivalent circuit processing unit 102 described above may be appropriately implemented by using various known methods.

The shape imaging processing unit 103 generates a circuit shape diagram (circuit geometric shape diagram) representing an accurate geometric shape of the circuit shape data generated by the electric CAD 201.

For example, the shape imaging processing unit 103 projects a circuit shape to a matrix of a predetermined pixel size (for example, 64 pixels×64 pixels), and extracts pixels overlapping with the circuit shape to create a circuit geometric shape diagram. A circuit geometric shape diagram is a geometric shape diagram that accurately represents a circuit shape, and is a shape image indicating the shape of a circuit.

The shape imaging processing unit 103 may generate a circuit shape diagram by appropriately selecting shape extraction of a circuit shape or pixelization of the circuit shape.

Hereinafter, the circuit geometric shape diagram generated by the shape imaging processing unit 103 may be referred to as an image P.

In the circuit geometric shape diagram generated by the shape imaging processing unit 103, slits, slots, holes, openings, and the like included in the circuit shape of a plane pattern are illustrated without omission. For example, a circuit geometric shape maintains the specific shapes (slit and the like) removed from the circuit shape data by the shape simplification processing unit 101.

A plurality of circuit geometric shape diagrams generated by the shape imaging processing unit 103 also include arrangement information such as an arrangement order of the plurality of laminated layers in the original circuit shape data. Accordingly, the plurality of circuit geometric shape diagrams generated by the shape imaging processing unit 103 include relative arrangement information between the plane pattern layer and the layer adjacent to the plane pattern layer in which a line pattern is formed. For example, the circuit geometric shape diagram generated by the shape imaging processing unit 103 includes structure information of the planar structure outer edge portion in the plane pattern layer.

The circuit geometric shape diagram (image P) generated by the shape imaging processing unit 103 is input (multichannel input) to the machine learning model 202 by the machine learning processing unit 106 together with the current distribution image (image Q) generated by the equivalent circuit processing unit 102.

The shape discretization processing unit 104 discretizes the substrate circuit shape generated by the electric CAD 201 and the surrounding space to divide (discretize) them into elements having a simple shape such as a lattice (rectangular parallelepiped), a triangular prism, or a tetrahedral mesh. For example, the shape discretization processing unit 104 converts data into numerical data while maintaining the geometric shape of a circuit.

The shape discretization processing unit 104 may achieve discretization by using, for example, finite difference method, finite element method, finite volume method, boundary element method, or the like, and may use various methods other than these methods.

The discretized circuit shape data generated by the shape discretization processing unit 104 is input to the EMI simulator 105.

The EMI simulator 105 executes an EMI simulation by electromagnetic field analysis using data of space including the discretized circuit shape generated by the shape discretization processing unit 104. The EMI simulator 105 predicts EMI emitted from a circuit by using, for example, finite difference time domain (FDTD) method.

As described above, the equivalent circuit processing unit 102 calculates a current distribution for each of 10 types of frequencies of $9.0\times10^8$ Hz, $9.1\times10^8$ Hz, $9.2\times10^8$ Hz, $9.3\times10^8$ Hz, $9.4\times10^8$ Hz, $9.5\times10^8$ Hz, $9.6\times10^8$ Hz, $9.7\times10^8$ Hz, $9.8\times10^8$ Hz and $9.9\times10^8$ Hz. The EMI simulator 105 performs an EMI simulation for each of these frequencies and calculates EMI values.

The method used by the EMI simulator 105 is not limited to the FDTD method. The EMI simulator may appropriately changing methods. For example, the EMI simulator may perform electromagnetic field analysis using a spectrum method.

Simulation results (EMI values) calculated by the EMI simulator 105 are input to the machine learning model 202 as correct labels.

Figure 4:
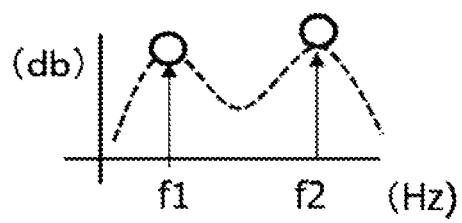
FIG. 4 is for explaining simulation results calculated by an EMI simulator of the information processing apparatus as an example of the embodiment.

FIG. 4 is for explaining EMI values (simulation results) calculated by the EMI simulator 105 of the information processing apparatus 1 as an example of the embodiment.

In FIG. 4, EMI values (unit: V/m) as simulation results are illustrated by a graph in which a horizontal axis indicates a frequency (unit: Hz) and a vertical axis indicates a decibel value (db) of EMI.

The machine learning processing unit 106 combines the current distribution image (image Q) generated by the equivalent circuit processing unit 102, the geometric shape diagram (image P) generated by the shape imaging processing unit 103, and simulation results calculated by the EMI simulator 105, and inputs them as training data to the machine learning model 202.

The machine learning model 202 is a machine learning model generated by machine learning based on training data. The machine learning model 202 functions as an EMI prediction model that predicts EMI based on input data. The output of the machine learning model 202 may be referred to as a prediction result.

Creation of the machine learning model 202 may be achieved by using a known method, and a description of the method for creating the machine learning model 202 in the information processing apparatus 1 will be omitted.

As a training process for the machine learning model 202, the machine learning processing unit 106 combines the current distribution image (image Q) generated by the equivalent circuit processing unit 102 and the geometric shape diagram (image P) generated by the shape imaging processing unit 103, and inputs them as input data to the machine learning model 202.

The machine learning processing unit 106 complements the circuit shape data of a plane pattern, from which information on specific shapes is removed by the shape simplification processing unit 101, with the circuit geometric shape generated by the shape imaging processing unit 103.

As a training process for the machine learning model 202, the machine learning processing unit 106 inputs simulation results (EMI values) calculated by the EMI simulator 105 to the machine learning model 202 as correct labels.

The current distribution image (image Q), the geometric shape diagram (image P), and the EMI values correspond to training data.

The machine learning processing unit 106 causes the machine learning model 202 to perform machine learning by using the current distribution image (image Q) and the geometric shape diagram (image P) as input data and the simulation results by the EMI simulator 105 as correct labels.

Therefore, the machine learning processing unit 106 generates an EMI prediction model (machine learning model 202) by machine learning based on training data including a current distribution image, a geometric shape image (shape image), and EMI values.

The machine learning processing unit 106 may input the current distribution image (image Q), the circuit geometric shape diagram (image P), and the EMI values to the machine learning model 202 by using multichannel input.

Figure 5:
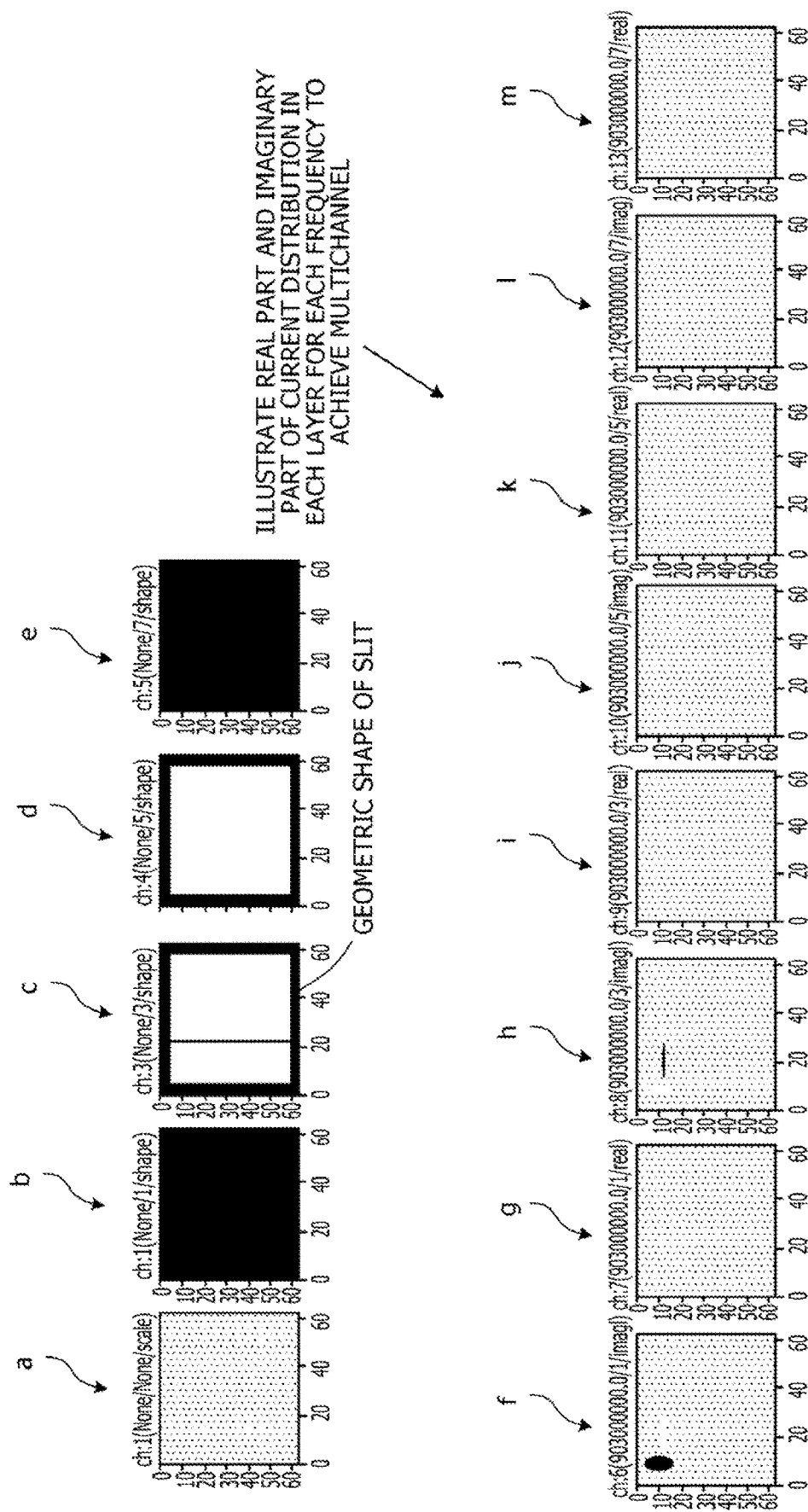
FIG. 5 exemplifies input data in the information processing apparatus as an example of the embodiment.
Figure 6A:
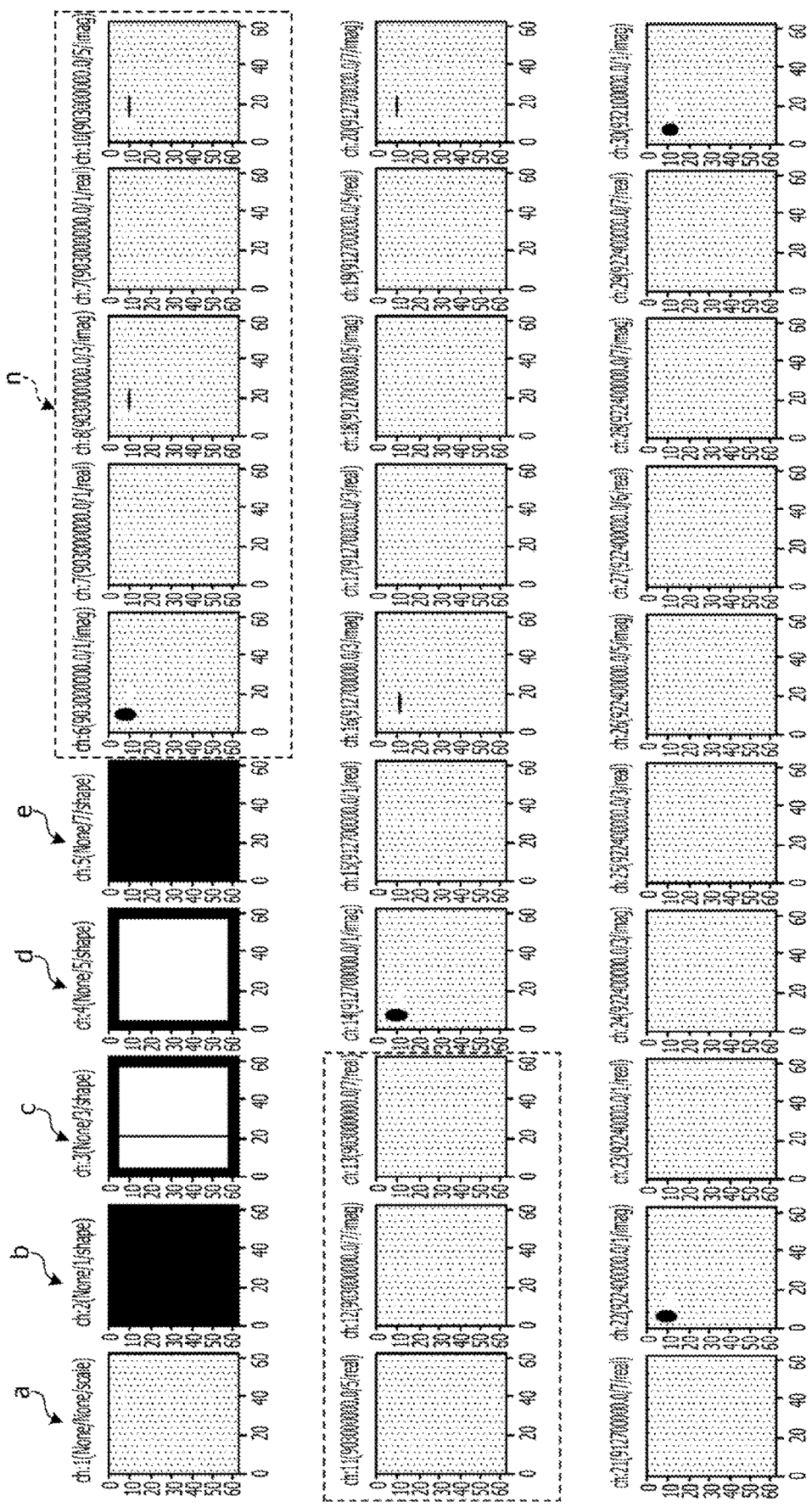
FIG. 6 (i.e., FIGS. 6A to 6C) exemplifies input data in the information processing apparatus as an example of the embodiment.
Figure 6B:
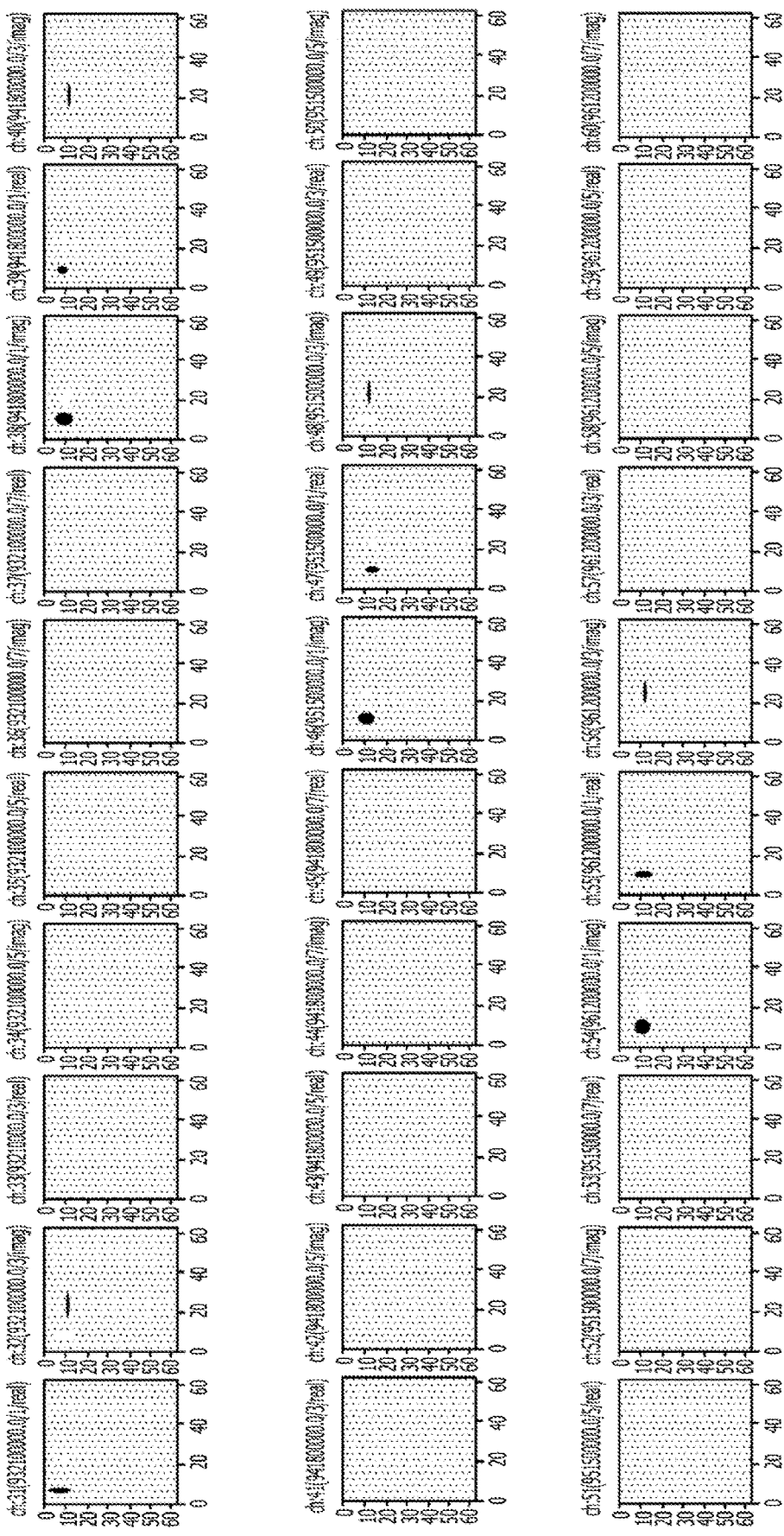
Figure 6C:
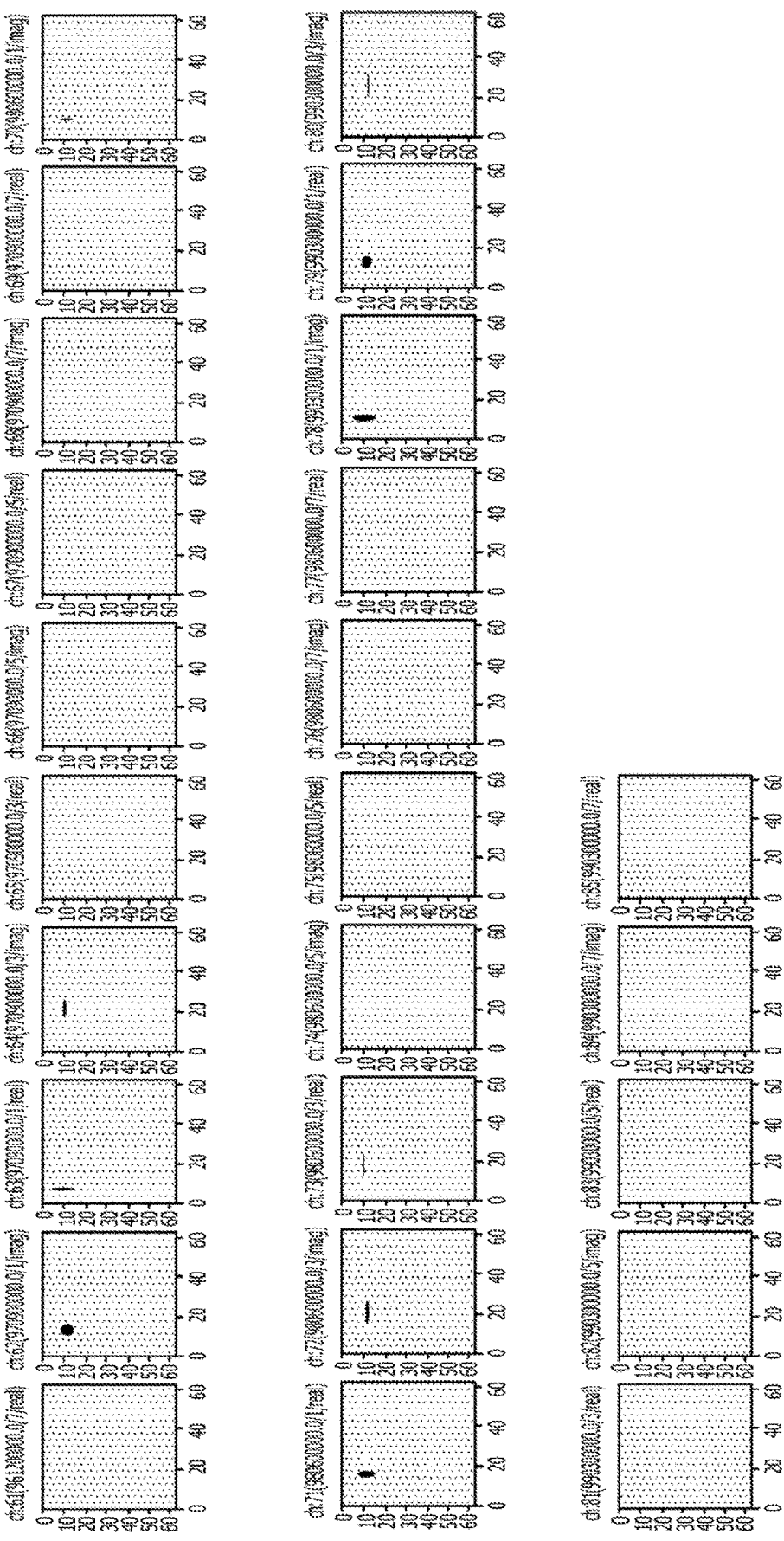

FIG. 5 and FIG. 6 (FIGS. 6A to 6C) each exemplify input data in the information processing apparatus 1 as an example of the embodiment.

In the examples illustrated in FIG. 5 and FIG. 6, input data generated based on circuit shape data configured as a four-layer substrate is illustrated.

In FIG. 5, for example, reference symbol a is (length) scale information on the current distribution image and the geometric shape diagram. The scale information indicates, for example, a scalar value representing the scale of a current distribution image and a geometric shape diagram. As the scalar value, a length scale corresponding to a side of one pixel may be used.

In FIG. 5, reference symbols b to e respectively represent geometric shape diagrams of the four-layer substrate configuring the circuit shape data. For example, in the geometric shape diagram indicated by reference symbol c, a slit formed in a plane pattern is indicated by a vertical line. Reference symbols f to m are current distribution images of each layer.

A current distribution image of the real part and a current distribution image of the imaginary part are formed for each layer.

Current flowing in an electronic circuit varies for each frequency. For example, a current distribution has a distribution over a frequency.

In circuit design, it is important to reduce the peak of an EMI spectrum. The peak of an EMI spectrum is obtained as a frequency at which the maximum value of current distribution is maximum. Such frequency of a peak is called a resonance frequency.

In the information processing apparatus 1, the value of a resonance frequency of an electronic circuit and the current distribution of the electronic circuit at the resonance frequency may be set as feature values, and the machine learning model 202 may be generated by performing machine learning on the relationship between EMI intensity and the feature values.

As described above, the equivalent circuit processing unit 102 calculates a current distribution for each of 10 types of frequencies of $9.0 \times 10^8$ Hz, $9.1 \times 10^8$ Hz, $9.2 \times 10^8$ Hz, $9.3 \times 10^8$ Hz, $9.4 \times 10^8$ Hz, $9.5 \times 10^8$ Hz, $9.6 \times 10^8$ Hz, $9.7 \times 10^8$ Hz, $9.8 \times 10^8$ Hz and $9.9 \times 10^8$ Hz.

The machine learning processing unit 106 generates input data for each of these frequencies.

In the input data exemplified in FIG. 6, reference symbol a is scale information on the current distribution image and the geometric shape diagram. Reference symbols b to e respectively represent geometric shape diagrams of the four-layer substrate configuring the circuit shape data. Reference symbol n indicates current distribution images of each layer at a frequency of $9.0 \times 10^8$ Hz. A current distribution image of the real part and a current distribution image of the imaginary part for each layer are illustrated.

Similarly, the input data exemplified in FIG. 6 includes a current distribution image of the real part and a current distribution image of the imaginary part for each layer at each of the other frequencies $9.1 \times 10^8$ Hz, $9.2 \times 10^8$ Hz, $9.3 \times 10^8$ Hz, $9.4 \times 10^8$ Hz, $9.5 \times 10^8$ Hz, $9.6 \times 10^8$ Hz, $9.7 \times 10^8$ Hz, $9.8 \times 10^8$ Hz and $9.9 \times 10^8$ Hz.

The machine learning processing unit 106 inputs multichannel data of a plurality of channels (85 channels in the example illustrated in FIG. 6) in which current distribution images of each layer at each of the frequencies, scale information, and each geometric shape diagram exemplified in FIG. 6 are set as individual channels, to the machine learning model 202 as input data.

The prediction processing unit 107 predicts, by using the machine learning model 202, the results to be output when prediction target data are input to the model. The prediction target data are a current distribution image (image Q) generated by the equivalent circuit processing unit 102 and a geometric shape diagram (image P) generated by the shape imaging processing unit 103.

The prediction processing unit 107 obtains a prediction result by inputting the prediction target data to the machine learning model 202. By comparing the prediction result with a result of simulation by the EMI simulator 105, prediction accuracy may be calculated and the machine learning model 202 may be evaluated.

(B) Operation

Figure 7:
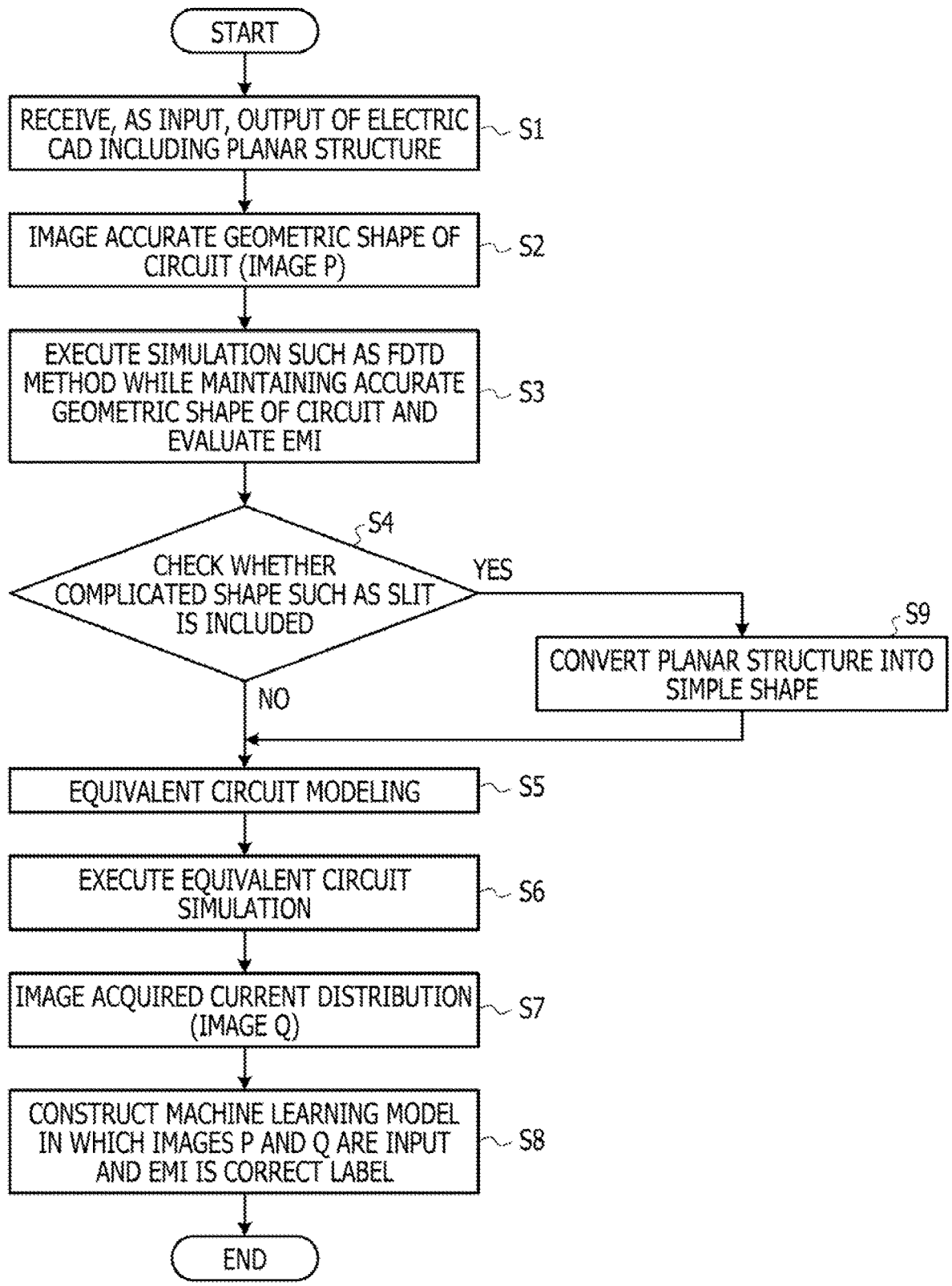
FIG. 7 is a flowchart for explaining a process in the information processing apparatus as an example of the embodiment.

A process in the information processing apparatus 1 as an example of the embodiment configured as described above will be described with reference to a flowchart (steps S1 to S9) illustrated in FIG. 7.

In step S1, each of the shape simplification processing unit 101, the shape imaging processing unit 103, and the shape discretization processing unit 104 acquires, from the electric CAD 201, circuit shape data including a plurality of layers including a plane pattern layer.

In step S2, the shape imaging processing unit 103 generates a circuit shape diagram (circuit geometric shape diagram: image P) representing an accurate geometric shape of each layer in the circuit shape data generated by the electric CAD 201.

In step S3, the shape discretization processing unit 104 discretizes the circuit shape data generated by the electric CAD 201. The EMI simulator 105 executes simulation such as the FDTD method by using the discretized circuit shape data generated by the shape discretization processing unit 104 to evaluate EMI by the circuit shape data.

In step S4, the shape simplification processing unit 101 checks whether a complex specific shape such as a slit, a slot, or a hole is included in the plane pattern layer. When a complex specific shape such as a slit is included in the plane pattern layer as a result of the checking (see the YES route in step S4), the process proceeds to step S9.

In step S9, the shape simplification processing unit 101 generates a simplified circuit model for each of the plurality of layers (substrates) included in the circuit shape data. For example, with respect to the plane pattern layer, the shape simplification processing unit 101 simplifies the shape (plane shape) of the plane pattern included in the circuit. The shape simplification processing unit 101 generates a simplified circuit model by removing slits and the like included in the plane pattern by simplification. After that, the process proceeds to step S5.

When a complex specific shape such as a slit is not included in the plane pattern layer as a result of the checking in step S4 (see the NO route in step S4), the process also proceeds to step S5.

In step S5, the shape simplification processing unit 101 generates an equivalent circuit model of each layer including the plane pattern layer based on the generated simplified circuit model or the circuit shape data that does not include a complex specific shape. In this case, an advanced model of the outer edge portion of the plane pattern is not employed.

In step S6, the equivalent circuit processing unit 102 executes an equivalent circuit simulation to calculate a current distribution in an electronic circuit for each frequency based on the equivalent circuit model.

In step S7, the equivalent circuit processing unit 102 generates a current distribution image (image Q) by imaging the calculated current distribution.

In step S8, the machine learning processing unit 106 constructs the machine learning model 202 in which the images P and Q are input data and EMI is a correct label. After that, the process is terminated.

In the above-described flowchart, in a case where the circuit shape of the plane pattern layer does not include a complicated specific shape, and an equivalent circuit model using the structure of the plane pattern as it is may be used, the process of step S5 may be omitted. In this case, the circuit geometric shape diagram may be used as supporting information, and accordingly, it is possible to achieve construction of more accurate AI.

(C) Effects

As described above, according to the information processing apparatus 1 as an example of the embodiment, the shape simplification processing unit 101 simplifies the circuit shape data of a plane pattern to generate a simplified circuit model in which specific shapes such as a slit are omitted. The equivalent circuit processing unit 102 performs equivalent circuit analysis based on an equivalent circuit model generated by the shape simplification processing unit 101, and generates a current distribution image by calculating a current distribution in an electronic circuit for each frequency. Thus, the cost of calculation for equivalent circuit analysis may be reduced.

Human trouble of discretization may be reduced by the shape simplification processing unit 101 converting the structure (planar structure) of a plane pattern including a slit or the like into a simple geometric shape (simplified circuit model). Since the resolution of a space may be increased by the conversion into a simple geometric shape, the calculation cost of an equivalent circuit simulation by the equivalent circuit processing unit 102 may be reduced.

For example, since current across a slit and electrical coupling across the layer of a planar structure outer edge portion are not modeled, the calculation cost of an equivalent circuit simulation by the equivalent circuit processing unit 102 may be reduced.

The shape imaging processing unit 103 generates a circuit shape diagram (circuit geometric shape diagram) representing an accurate geometric shape of the circuit shape data, and the machine learning processing unit 106 causes the machine learning model 202 to perform machine learning by using the geometric shape diagram (image P) together with a current distribution image (image Q) as input data.

The geometric shape diagram holds information on specific shapes (for example, electrical coupling across a slit or the layer of a planar structure outer edge portion) which have been removed in the simplified circuit model. Accordingly, information on the structure of a circuit model that is lost due to simplification by the shape simplification processing unit 101 may be reflected in the machine learning model 202. Therefore, even when the shape simplification processing unit 101 simplifies a circuit model, it is possible to suppress deterioration in accuracy of machine learning due to the simplification.

Figure 8:
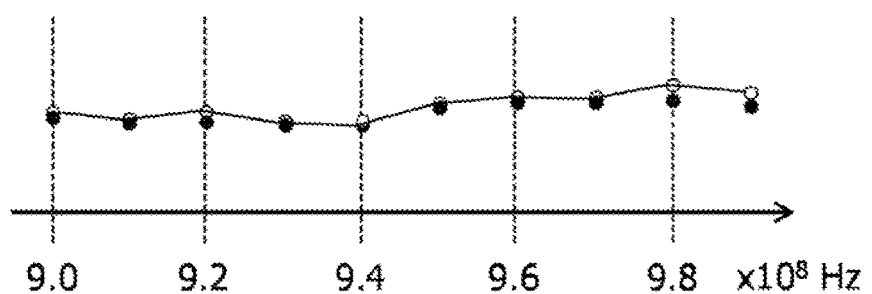
FIG. 8 illustrates a comparison between prediction results obtained by a machine learning model that has performed machine learning in the information processing apparatus as an example of the embodiment, and calculation results of EMI obtained by an FDTD method.
Figure 9:
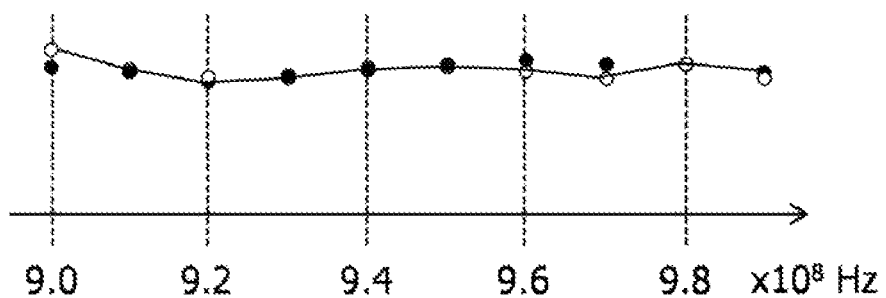
FIG. 9 illustrates a comparison between prediction results obtained by a machine learning model that has performed machine learning in the information processing apparatus as an example of the embodiment, and calculation results of EMI obtained by the FDTD method.

FIG. 8 and FIG. 9 illustrate a comparison between prediction results obtained by the machine learning model 202 that has performed machine learning in the information processing apparatus 1 as an example of the embodiment, and calculation results of EMI obtained by the FDTD method, for a circuit including a slit that is not included in training data. It is seen that both indicate good matching.

In FIG. 8 and FIG. 9, white circles indicate calculation results of EMI by the FDTD method, and black circles indicate prediction results obtained by the prediction processing unit 107 using the machine learning model 202 in the information processing apparatus 1. As illustrated in FIG. 8 and FIG. 9, the machine learning model 202 that has been caused to perform machine learning by the machine learning processing unit 106 in the information processing apparatus 1 obtained prediction equivalent to the EMI simulation results by the FDTD method.

(D) Others

Figure 10:
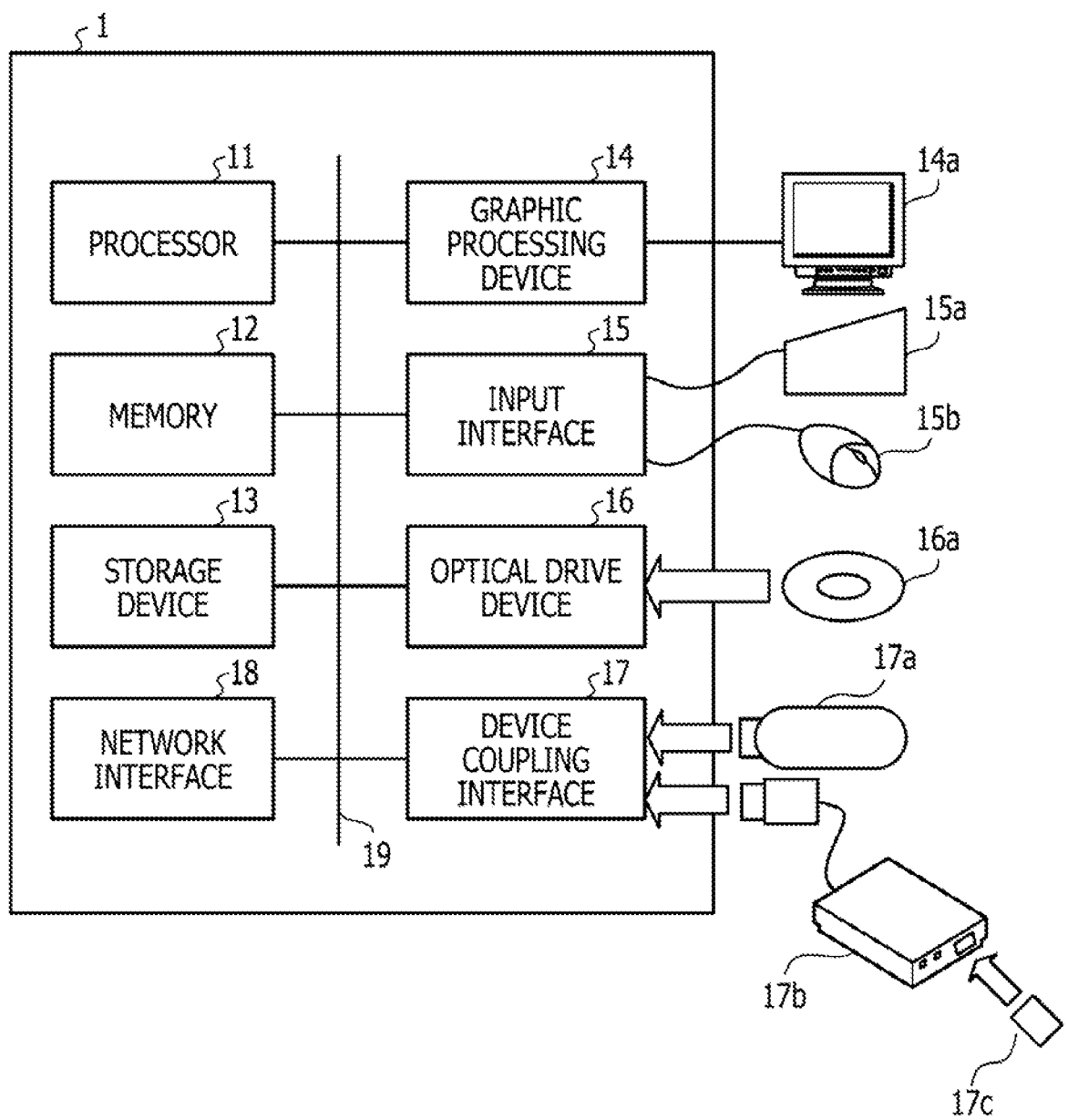
FIG. 10 exemplifies a hardware configuration of the information processing apparatus as an example of the embodiment.

FIG. 10 exemplifies a hardware configuration of the information processing apparatus 1 as an example of the embodiment.

The information processing apparatus 1 is a computer including, for example, a processor 11, a memory 12, a storage device 13, a graphic processing device 14, an input interface 15, an optical drive device 16, a device coupling interface 17, and a network interface 18 as constituent components. These constituent components 11 to 18 are so configured as to be mutually communicable via a bus 19.

The processor (control unit) 11 controls the entire information processing apparatus 1. The processor 11 may be a multiprocessor. For example, the processor 11 may be any one of a central processing unit (CPU), a microprocessor unit (MPU), a digital signal processor (DSP), an application-specific integrated circuit (ASIC), a programmable logic device (PLD), and a field-programmable gate array (FPGA). The processor 11 may be a combination of two or more of the CPU, the MPU, the DSP, the ASIC, the PLD, and the FPGA.

By the processor 11 executing a control program (machine learning program, not illustrated) for the information processing apparatus 1, the functions as the shape simplification processing unit 101, the equivalent circuit processing unit 102, the shape imaging processing unit 103, the shape discretization processing unit 104, the EMI simulator 105, the machine learning processing unit 106, and the prediction processing unit 107 illustrated in FIG. 1 are achieved.

The information processing apparatus 1 achieves the functions as the shape simplification processing unit 101, the equivalent circuit processing unit 102, the shape imaging processing unit 103, the shape discretization processing unit 104, the EMI simulator 105, the machine learning processing unit 106, and the prediction processing unit 107 by executing, for example, a program (machine learning program or operating system (OS) program) recorded in a computer-readable non-transitory recording medium.

The information processing apparatus 1 may achieve the function as the electric CAD 201 by executing a program (electric CAD program) recorded in a computer-readable non-transitory recording medium.

Programs describing the details of the processes to be executed by the information processing apparatus 1 may be stored in various recording media. For example, the programs to be executed by the information processing apparatus 1 may be stored in the storage device 13. The processor 11 loads at least a part of the programs in the storage device 13 into the memory 12 and executes the loaded programs.

The programs to be executed by the information processing apparatus 1 (processor 11) may be stored in a non-transitory portable recording medium, such as an optical disc 16a, a memory device 17a, or a memory card 17c. For example, the programs stored in the portable recording medium may be executed after being installed in the storage device 13 by control from the processor 11. The processor 11 may read the programs directly from the portable recording medium and execute the programs.

The memory 12 is a storage memory including a read-only memory (ROM) and a random-access memory (RAM). The RAM of the memory 12 is used as a main storage device of the information processing apparatus 1. In the RAM, at least part of a program to be executed by the processor 11 is temporarily stored. In the memory 12, various data to be used for the processes by the processor 11 is stored.

The storage device 13 is a hard disk drive (HDD), a solid state drive (SSD), a storage class memory (SCM), or the like and stores various data. The storage device 13 is used as an auxiliary storage device of the information processing apparatus 1.

In the storage device 13, the OS program, the control program, and various data are stored. The control program includes a machine learning program.

As the auxiliary storage device, a semiconductor storage device, such as the SCM or a flash memory, may be used. A plurality of storage devices 13 may be used to constitute redundant arrays of inexpensive disks (RAID).

The storage device 13 may store circuit shape data generated by the electric CAD 201, a current distribution image (image Q) generated by the equivalent circuit processing unit 102, and a geometric shape diagram (image P) generated by the shape imaging processing unit 103.

A monitor 14a is coupled to the graphic processing device 14. The graphic processing device 14 displays an image over a screen of the monitor 14a in accordance with an instruction from the processor 11. Examples of the monitor 14a include a display device with a cathode ray tube (CRT) and a liquid crystal display device.

A keyboard 15a and a mouse 15b are coupled to the input interface 15. The input interface 15 transmits signals transmitted from the keyboard 15a and the mouse 15b to the processor 11. The mouse 15b is an example of a pointing device, and a different pointing device may be used. The different pointing device may be a touch panel, a tablet, a touch pad, a track ball, or the like.

The optical drive device 16 reads data recorded in the optical disc 16a using laser light or the like. The optical disc 16a is a portable non-transitory recording medium in which data is recorded so that the data is readable using light reflection. Examples of the optical disc 16a are a Digital Versatile Disc (DVD), a DVD-RAM, a compact disc read-only memory (CD-ROM), a CD-recordable (R), and a CD-rewritable (RW).

The device coupling interface 17 is a communication interface for coupling peripheral devices to the information processing apparatus 1. For example, the device coupling interface 17 may couple the memory device 17a and a memory reader-writer 17b. The memory device 17a is a non-transitory recording medium having a function of communicating with the device coupling interface 17 and is, for example, a Universal Serial Bus (USB) memory. The memory reader-writer 17b writes data to or reads data from the memory card 17c. The memory card 17c is a card-type non-transitory recording medium.

The network interface 18 is coupled to a network. The network interface 18 transmits and receives data via the network. Other information processing apparatuses, communication devices, and the like may be coupled to the network. For example, other information processing apparatuses that execute the electric CAD 201 or a storage system that stores circuit shape data generated by the electric CAD 201 may be coupled.

The techniques disclosed herein are not limited to the above-described embodiment, and may be implemented by making various modifications thereto without departing from the gist of the embodiment. Each of the configurations and processes described in the embodiment may be selected or omitted as appropriate or may be appropriately combined with another one or more of the configurations and processes described in the embodiment.

The above-described disclosure enables a person skilled in the art to implement and manufacture the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a machine learning program for causing a computer to execute a process comprising:
   acquiring a shape image that indicates a shape of a circuit based on circuit information before shape simplification processing, the shape of the circuit including at least any one of a slit, a slot, a hole, or an opening;
   acquiring a current distribution image that is an image indicating a current distribution in an equivalent circuit model by performing an equivalent circuit simulation on the equivalent circuit model, the equivalent circuit model being a circuit model derived by applying the shape simplification processing to the circuit defined by the circuit information to remove the at least any one of a slit, a slot, a hole, or an opening from the circuit;
   acquiring an electromagnetic interference (EMI) value by electromagnetic field analysis based on the circuit information;
   generating training data by combining the current distribution image, the shape image, and the EMI value into the training data;
   generating an EMI prediction model by machine learning based on the generated training data that includes the current distribution image, the shape image, and the EMI value;
   inputting, to the generated EMI prediction model, prediction target data including a geometric shape diagram and a current distribution image, to cause the generated EMI prediction model to output a prediction result of the EMI value for the prediction target data.

2. The non-transitory computer-readable recording medium storing a machine learning program according to claim 1,
   wherein the process of acquiring the current distribution image includes
   generating a simplified circuit model by applying the shape simplification processing to the circuit defined by the circuit information to simplify a pattern shape of a plane pattern acquired from the circuit information, and
   acquiring the current distribution image by the equivalent circuit simulation based on the equivalent circuit model generated by performing discretization on the simplified circuit model.

3. The non-transitory computer-readable recording medium storing a machine learning program according to claim 1,
   wherein the process of acquiring the shape image includes generating the shape image by performing shape extraction of a plane pattern acquired from the circuit information.

4. An information processing apparatus comprising:
   a memory; and
   a processor circuit coupled to the memory, the processor circuit being configured to:
   acquire a shape image that indicates a shape of a circuit based on circuit information before shape simplification processing, the shape of the circuit including at least any one of a slit, a slot, a hole, or an opening,
   acquires a current distribution image that is an image indicating a current distribution in an equivalent circuit model by performing an equivalent circuit simulation on the equivalent circuit model, the equivalent circuit model being a circuit model derived by applying the shape simplification processing to the circuit defined by the circuit information to remove the at least any one of a slit, a slot, a hole, or an opening from the circuit,
   acquires an electromagnetic interference (EMI) value by electromagnetic field analysis based on the circuit information,
   generating training data by combining the current distribution image, the shape image, and the EMI value into the training data,
   generates an EMI prediction model by machine learning based on training data that includes the current distribution image, the shape image, and the EMI value;
   inputting, to the generated EMI prediction model, prediction target data including a geometric shape diagram and a current distribution image, to cause the generated EMI prediction model to output a prediction result of the EMI value for the prediction target data.

5. A computer-implemented method comprising:
   acquiring a shape image that indicates a shape of a circuit based on circuit information before shape simplification processing, the shape of the circuit including at least any one of a slit, a slot, a hole, or an opening;
   acquiring a current distribution image that is an image indicating a current distribution in an equivalent circuit model by performing an equivalent circuit simulation on the equivalent circuit model, the equivalent circuit model being a circuit model derived by applying the shape simplification processing to the circuit defined by the circuit information to remove the at least any one of a slit, a slot, a hole, or an opening from the circuit;
   acquiring an electromagnetic interference (EMI) value by electromagnetic field analysis based on the circuit information;
   generating training data by combining the current distribution image, the shape image, and the EMI value into the training data;
   generating an EMI prediction model by machine learning based on the generated training data that includes the current distribution image, the shape image, and the EMI value;
   inputting, to the generated EMI prediction model, prediction target data including a geometric shape diagram and a current distribution image, to cause the generated EMI prediction model to output a prediction result of the EMI value for the prediction target data.

* * * * *